Aug. 8, 1950    M. R. XIMENEZ ET AL    2,517,753
MICROPOROUS SHEET AND METHOD OF MANUFACTURE
Filed Nov. 15, 1945
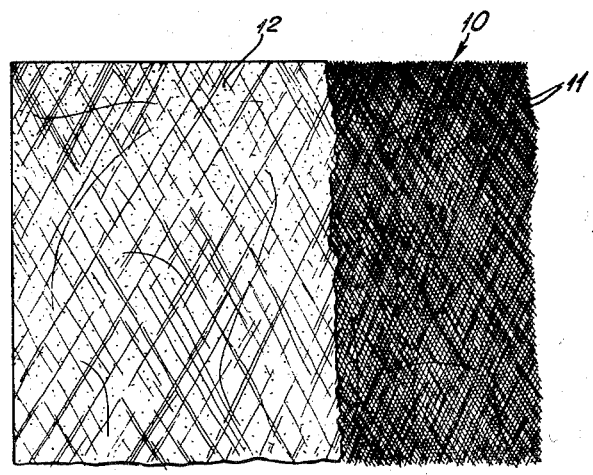
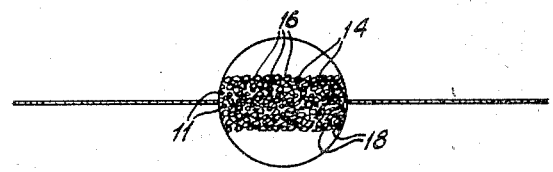
INVENTORS
MANUEL R. XIMENEZ
and JOHN H. FERGUSON
BY Vergil C. Kline
ATTORNEY Patented Aug. 8, 1950

2,517,753

UNITED STATES PATENT OFFICE 2,517,753

MICROPOROUS SHEET AND METHOD OF MANUFACTURE

Manuel R. Ximenez, Fanwood, and John H. Ferguson, Somerville, N. J., assignors to Johns-Manville Corporation, New York, N. Y., a corporation of New York Application November 15, 1945, Serial No. 628,824

6 Claims. (Cl. 210—204)

This invention relates to microporous sheets and laminates, and is particularly concerned with improvements in microporous chemical filters and a method of manufacturing such filters.

Filter sheets of the type which are at present available for use in plate or tube filters and for related purposes, have generally been found to lack one or more properties which are desirable for use in filtration of chemicals. To avoid costly replacement and maintenance problems and filtrate contamination, it is essential that the sheet filters shall possess high resistance to chemical attack and good wet and dry strength. Such sheets should have sufficient strength when wet to withstand distortion and strain and to resist tearing or puncture, under filtering conditions and during washing, cleaning and handling operations.

Such sheets should have the chemical stability to resist, over long periods, deterioration by oils and by weak and strong acids and alkalis while also possessing the wet and dry strength, toughness and flexibility to withstand the rough handling to which thin sheet filters are subjected in commercial plate filter dismantling, cleaning and reassembly operations. Such sheet filters should have the uniform capillary pore structure which is desirable for efficient clarification and removal of impurity particles from filtrates with minimum resistance to passage of filtrate, and with minimum penetration of impurities such as would interfere with efficient cleaning and removal of trapped impurities from the filter surfaces.

A primary object of the present invention is to provide microporous sheet filters having all of the aforementioned desirable properties.

A more specific object is to provide a microporous sheet having such uniform capillary porosity, physical strength and resistance to deterioration by chemicals as to adapt it for use as a chemical filter.

Another object is to provide a method for manufacturing microporous sheets and laminates of high capillary porosity and good wet and dry strength.

A further object is to provide a continuous, efficient and simple method of producing microporous sheet filters of suitable physical strength and resistance to acids and chemicals.

With the aforementioned objects in view, the invention consists in the improved microporous sheets and method of manufacturing same which are hereinafter described and more particularly defined by the accompanying claims.

In the following description reference will be made to the attached drawings, in which:

Fig. 1 is a diagrammatic face view of a lightly impregnated and coated glass fiber mat (showing part of the mat uncoated) illustrating the sheet filters forming the subject of the present invention; and Fig. 2 is an edge view of a portion of a sheet such as shown in Fig. 1, on which there is superimposed a highly magnified section portraying the fine capillary porosity of the structure.

The improved microporous sheet filter of the present invention, as it is illustrated in the drawings, consists essentially of a supporting mat 10 of superposed layers of fine caliper glass fibers 11, such mat being impregnated and coated with a chemical resistant microporous filling 12. The filling 12 comprises a major proportion of finely divided chemical resistant bulk imparting filler particles 14 which are bonded together and also strongly bonded to the fibers 11 of the mat by a strongly adhesive and chemically stable binder 16 consisting of a vinyl-chloride-vinylidene-chloride copolymer of at least 85% vinyl-chloride content. The filling also preferably incorporates a small proportion of finely divided water-swellable clay particles 18 such as bentonite.

A single microporous product made in accordance with the present invention may have a thickness ranging from 10 mils upwardly. Individual sheets or laminates may be built up to a thickness of ¼ inch or more. In the manufacture of thin microporous sheets the filler coatings need only be sufficiently thick to impart the necessary degree of toughness and physical strength, together with high, uniform capillary porosity, to adapt the resulting sheet product for use in plate or tube filter equipment or for related purposes.

In the preferred microporous sheet the basic supporting element is a fine mesh glass fiber mat incorporating fine caliper fibers each of which preferably has a length of several inches and an average diameter not substantially exceeding .005 inch. A preferred mat 10 of uniform tensile strength in all directions may be formed by several superimposed layers of fibers, with the fibers in alternate layers disposed transversely to each other and obliquely to the lateral edges of the sheet product.

A preferred acid resistant filler for imparting microporosity to the sheet product is finely divided diatomaceous silica. A suitable grade of diatomaceous silica is a white flux-calcined product having an apparent loose density of about 10 lbs. per cubic ft. and classifying as to particle size largely between 4 and 20 microns. A flux-calcined diatomaceous silica of this character has an extremely large specific surface in the neighborhood of 10,000 sq. cm. of surface per gram of material. Suitable alkali resistant fillers of good bulk imparting qualities include asbestos shorts or fines and finely divided magnesium and aluminum silicates such as pumice or calcined clay.

The preferred binder for bonding the finely divided bulk imparting filler particles to each other and to the glass fiber core, is a vinyl-chloride-vinylidene-chloride copolymer in which the proportion of vinylidene-chloride does not exceed 15%, and normally ranges between 7½ and 15%. A binder of this type has been found to possess high resistance to deterioration by acids, oils, alkalis and other chemicals. Furthermore such binder has a particularly high degree of adhesiveness or bonding qualities for silica and silicate compositions, including glass fibers and diatomaceous silica particles, in the proportions in which it is employed in the present sheets.

The preferred process contemplates forming a dilute aqueous suspension or dispersion of the filler particles and of emulsified binder. Satisfactory dispersion is secured by incorporating therein a small amount of bentonite or equivalent water-swellable clay. Accordingly, the initial step in the preferred process is that of forming an aqueous suspension of a small amount of bentonite in water, and agitating the suspension to develop maximum swelling of the bentonite. There is then added to the suspension the proportions of diatomaceous silica or other bulk imparting filler material and emulsified resin binder which had been determined as suitable for forming an impregnation bath. A suitably stable suspension incorporates diatomaceous silica or asbestos fines or other filler particles and bentonite, in approximately the proportions of 4 to 1 by weight. A suspension of satisfactory viscosity may be made up to include about 100 parts by weight of a 50% solids emulsion of the vinyl-chloride-vinylidene-chloride copolymer resin, about 25 parts bentonite, 100 parts diatomaceous silica or heat treated asbestos floats and about 800 parts by weight of water. The impregnating bath which is thus formed is maintained at approximately room temperature and is kept in continuous motion by slight agitation to insure the retention of a uniform viscosity throughout the bath.

The glass fiber mat, which may be of any desired width, is preferably unwound from a roll and passed through the impregnating bath at a controlled speed to insure a satisfactory degree of impregnation and coating when using an impregnant bath of predetermined viscosity. The weight of impregnant and coating material which is retained by the mat on its removal from the bath can be adjusted by the speed of travel of the mat through the impregnating bath, and by the use of a set of stationary doctor rods positioned at the exit end of the bath for squeezing out excess coating composition at a point where such excess may return to the bath. The thus filled and coated mat may then be passed between a second set of stationary calibrating rods whereby a sheet of uniform thickness and porosity is produced. If a sheet of substantial thickness is desired, the impregnating and doctoring operation may be repeated by a second pass through a second set of impregnating and doctoring units.

After the sheet has been properly impregnated, coated and doctored, it is passed through a drying and baking oven where it is subjected to gradually rising temperatures up to about 300–375° F. This operation is carried out for the purpose of driving off water and any other volatile constituents, and of fixing the binder in strongly adhering relation. Gradual release of the water which is trapped during the impregnating operation aids in the development of substantially uniform capillary porosity throughout the product, although the primary factor contributing to this result is the large proportion of bulk imparting filler particles which is distributed uniformly throughout the product.

To produce a sheet of suitable uniform capillary porosity, the filler particles and binder should be well and uniformly dispersed and in stable suspension during the impregnating and coating treatment. The viscosity of the impregnating bath should be limited within definite limits to insure a uniform impregnation and coating operation. For satisfactory impregnation and coating the water content of the impregnation bath should preferably range between 70% and 85% by weight. Individual thin microporous sheets are generally made up so that the fine mesh glass mat comprises between 25% and 42.5% by weight of the finished sheet. The filler components of the finished sheet may comprise 40–68% by weight of diatomaceous silica or asbestos shorts or other bulk imparting filler particles, 15–50% by weight of binder solids and 10–17% of bentonite clay. The finished filter generally contains 23–51% by weight of filler particles, 6–12.5% bentonite and 11.5–28.5% copolymer binder.

The fabricating method of the present invention avoids substantial densification of the sheet product during the forming, drying and heating treatment. Any shrinkage which takes place during drying and heating tends to reduce the porosity of the glass mat, but has no substantial adverse effect on the capillary porosity of the finished sheet, which is insured by the presence of a high proportion of bulk imparting filler particles.

It has been found that maximum capillary microporosity is developed for a given weight proportion of filler particles in the product when using particles which have been previously heat treated. For example, the preferred diatomaceous earth filler particle is one which has been calcined to a temperature above about 1800° F., and the preferred asbestos fiber filler material is a fine grade of chrysotile asbestos fiber floats which has been heat treated by exposure for a few minutes to a temperature in the range 900–1200° F.

The composition of the subject microporous sheets is such that they can be manufactured by a continuous operation without the use of cumbersome pressure curing equipment. Although the proportion of binder to granular and fibrous material in the finished sheet is comparatively low, adequate physical strength can be developed in single sheets and in multiple sheet laminates, without the use of pressure in amount which would seriously reduce the microporosity of the finished product.

As illustrating the degree of capillary porosity of the product, comparative capillary tests have been made which show that the microporous sheets of the present invention have wetting characteristics and liquid absorbing properties which are much greater than those possessed by available microporous sheet filters of wood, rubber or phenolic resin bonded granules and fibers. Furthermore, the microporous sheets of the present invention can be roughly handled and subjected to pressure fluid washing and cleaning treatments without danger of physical failure or weakening, whereas most conventional types of filter sheets will not stand such treatment, particularly when wet. Not only do the present microporous sheets withstand wetting without being weakened, but they have been found to suffer no substantial loss of weight or physical weakening after immersion in alkali electrolytes or sulfuric acid of about 5% concentration for a period of one year.

Individual microporous sheets having a thickness no greater than 10 mils, when made in accordance with the present invention, are effective filters for warm chemicals and oils and have adequate strength to allow of rough handling and strenuous cleaning and washing treatment. Any reasonable degree of physical strength and fine filtering characteristics can be developed by building up laminates. This laminating operation is very simple, since it involves no more than superimposing a predetermined number of the individual sheets immediately after the impregnation and coating treatment by immersion in the filler particle-binder bath, to form the laminates, and calibrating the laminate product to desired thickness by passage through sets of stationary doctor and calibrating rods. The bond is finally formed by heating to drive off moisture and to fix the resin on the filler particles. The bond thus developed between individual laminate sheets has been found to resist delamination and chemical attack. Adjustment of the porosity of the sheet is effected by selecting diatomaceous earth or asbestos filler particles of predetermined average size, and by varying the proportion of binder in the sheet and the temperature of the baking treatment.

The present microporous sheets consist wholly of components which retain all of their useful characteristics after they have been subjected to the treatment necessary for producing the sheet product. Accordingly, any scrap material which is left over as a result of size trimming operations, or any defective residues, can be reincorporated in a new sheet formulation as useful ingredients.

The chemical resistance of the copolymer resin binder is such as to impart stability and a long working life to the microporous sheets incorporating such binder. Such sheets may be employed in contact with acids, alkalis or most other chemicals without contaminating the chemicals thus treated. A sheet of adequate strength and capillary porosity may contain about 33% dry weight of glass fibers, 21% copolymer binder, 37% siliceous filler particles, and 9% bentonite. Sheets of the approximate composition given have densities of about 50 lbs. per cubic ft. and range in tensile strength between 1500 and 2500 lbs. per square inch. The characteristics of high microporosity combined with high physical strength apparently result from the exceptionally high adhesive attraction of the copolymer resin binder for siliceous fiber and filler particle surfaces, and from those characteristics of the binder which operate to limit any tendency to fill the capillary pores in and between the filler particles.

What we claim is:

1. A microporous sheet comprising a core of matted glass fibers, said core being impregnated and coated with a mixture of finely divided high bulking siliceous filler particles, and vinyl-chloride-vinylidene-chloride copolymer binder of at least 85% vinyl-chloride content, said sheet containing 25–42.5% by weight of glass fibers, 11.5–28.5% copolymer binder and a balance comprising chiefly said siliceous particles, and having good wet and dry strength together with uniform capillary porosity and high resistance to deterioration by chemicals.

2. A microporous article comprising a fine caliper glass fiber mat impregnated and coated with a mixture of finely divided high bulking siliceous particles in amount representing 23–51% by weight of the article and vinyl-chloride-vinylidene-chloride copolymer binder of at least about 85% vinyl-chloride content, said article containing substantial amounts each of siliceous fiber and filler particles together with 11.5–28.5% by weight of copolymer binder solids.

3. A microporous filter comprising a fine mesh mat of superposed layers of fine caliper glass fibers, and an acid resistant impregnant and coating for the mat comprising finely divided particles of siliceous filler material, bentonite and vinyl-chloride-vinylidene-chloride copolymer binder of at least about 85% vinyl-chloride content, said filter containing 25–42.5% by weight of glass fibers, 23–51% of siliceous filler particles, 6–12.5% bentonite and 11.5–28.5% copolymer binder.

4. The method of producing microporous filter sheets of good wet and dry strength which comprises, providing a fine mesh glass fiber mat, forming an aqueous suspension of 70–85% water content containing finely divided high bulking siliceous filler particles and emulsified vinyl-chloride-vinylidene-chloride copolymer binder of at least about 85% vinyl-chloride content, impregnating and coating said mat with said suspension, proportioning the materials to incorporate in the sheet 25–42.5% dry weight of fibers, 11.5–28.5% copolymer binders, and a balance comprising chiefly siliceous particles, and gradually heating the resulting sheet up to a temperature of 300–375° F. to remove moisture and to fix the binder.

5. The method of producing microporous sheets which comprises, providing a fine mesh mat comprising superposed layers of transversely laid fine caliper glass fibers, impregnating and coating said mat with an aqueous suspension containing finely divided high bulking siliceous filler particles and emulsified vinyl-chloride-vinylidene-chloride copolymer binder of at least about 85% vinyl-chloride content, removing excess coating from the mat and calibrating the sheet to uniform thickness by a doctoring treatment, proportioning the components of the sheet to include substantial dry weight proportions each of glass fibers and filler particles including 23–51% of said particles, together with 11.5–28.5% copolymer binder solids, and slowly heating the sheet to a final temperature of about 300–375° F. to remove moisture and to fix the binder.

6. The method of producing a microporous sheet adapted for use as a plate filter which comprises, providing a fine mesh mat comprising superposed layers of fine caliper glass fibers, impregnating and coating said mat with an aqueous suspension of finely divided high bulking siliceous particles, bentonite and emulsified vinyl-chloride-vinylidene-chloride copolymer binder of at least about 85% vinyl-chloride content, subjecting the sheet to a doctoring and calibrating treatment, gradually heating the sheet to a final temperature of about 300–375° F. to drive off moisture and to fix the binder, and proportioning the components of the sheet within the limits of about 25–42.5% by weight of glass fibers, 23–51% by weight of siliceous particles, 6–12.5% bentonite and 11.5–28.5% by weight of binder solids.

MANUEL R. XIMENEZ.
JOHN H. FERGUSON.

REFERENCES CITED

The following references are of record in the file of this patent:

UNITED STATES PATENTS

| Number | Name | Date |
|---|---|---|
| 1,938,982 | Smith | Dec. 12, 1933 |
| 1,944,550 | Ericson | Jan. 23, 1934 |
| 2,040,818 | Badollet | May 19, 1936 |
| 2,083,132 | Williams et al. | June 8, 1937 |
| 2,101,449 | Parry | Dec. 7, 1937 |
| 2,215,061 | Alt | Sept. 17, 1940 |
| 2,338,610 | Wiley | Jan. 4, 1944 |
| 2,367,880 | Lindh | Jan. 23, 1945 |
| 2,380,111 | Kasten | July 10, 1945 |
| 2,390,190 | Soday | Dec. 4, 1945 |

OTHER REFERENCES

Plastics Catalog, 1944, page 824.